United States Patent [19]
Jo

[11] Patent Number: 5,394,465
[45] Date of Patent: Feb. 28, 1995

[54] PARALLEL PHONE DETECTION CIRCUIT

[75] Inventor: Sung J. Jo, Singapore, Singapore

[73] Assignee: SGS-Thomson Microelectronics, Pte Ltd., Singapore

[21] Appl. No.: 10,361

[22] Filed: Jan. 28, 1993

[30] Foreign Application Priority Data

Dec. 21, 1992 [EP] European Pat. Off. ............ 92311665

[51] Int. Cl.⁶ .......................................... H04M 3/58
[52] U.S. Cl. .................... 379/377; 379/212; 379/157
[58] Field of Search ............... 379/377, 393, 381, 212, 379/162, 163, 161, 157, 400, 401

[56] References Cited

U.S. PATENT DOCUMENTS

| Re. 31,643 | 8/1984 | Waldman ........................ 379/393 X |
| 2,974,282 | 3/1961 | Scheftelowitz et al. . |
| 4,529,843 | 7/1985 | Boeckmann ........................ 379/393 |
| 5,095,504 | 3/1992 | Nishikawa et al. ............. 379/163 X |

FOREIGN PATENT DOCUMENTS

0067268A3 12/1982 European Pat. Off. .
61-152153 7/1986 Japan .
63-063247 3/1988 Japan .

OTHER PUBLICATIONS

2206 Technical Digest (AT&T Technologies) (1985) Oct. No. 77 Berkeley Heights, N.J.; "An Economical Hold Feature For A Microprocessor Controlled Telephone", L. C. Frey.

Primary Examiner—James L. Dwyer
Assistant Examiner—Paul A. Fournier
Attorney, Agent, or Firm—Felsman, Bradley, Gunter & Dillon

[57] ABSTRACT

A parallel phone detection circuit is described, the function of which is to enable a phone call to be transferred from a first telephone set to a second telephone set. The detection circuit maintains the first telephone set connected to the telephone line until the handset of the second telephone set has been taken off-hook, and then disconnects the first telephone set. The circuit operates by detecting the line current from the telephone line and produces the reference value for comparison purposes related to that line current.

17 Claims, 4 Drawing Sheets

PARALLEL PHONE DETECTION CIRCUIT

FIELD OF THE INVENTION

This invention relates to a parallel phone detection circuit. Such a circuit is used in the situation where there are two telephone sets connected to a common telephone line and where it is desired to transfer a call from one telephone set to another.

BACKGROUND TO THE INVENTION

This function is currently implemented by providing a hold button on the telephone set. The procedure is to depress the hold key and then replace the handset of the first telephone set on-hook. The function of the circuit is to maintain the first telephone set connected to the telephone line until the handset of the second telephone set has been taken off-hook, and then to disconnect the first telephone set.

This function is currently carried out by a voltage detection circuit which is implemented as a discrete circuit in the telephone set. This existing parallel phone detection circuit detects the voltage variation which occurs on the telephone line when the second telephone set has its handset taken off-hook. It then disconnects the first telephone set from the telephone line in response to the detection of this voltage variation. However, this circuit is not reliable when used in noisy environments in which voltage spikes can occur on the line. It is also costly because it requires a discrete circuit in the telephone set.

Moreover, the detection of voltages is unsatisfactory for the reason that telephone systems in different countries have different voltages. It is therefore necessary to tailor the detection threshold to individual country requirements.

The present invention seeks to provide a parallel phone detection circuit which does not suffer from these disadvantages.

SUMMARY OF THE INVENTION

According to the present invention there is provided a line current detection circuit for use in a telephone set comprising:
 means for deriving a comparison current from the line current of a telephone line;
 generating means for producing sequentially different values of reference currents;
 means for determining when the value of a reference current generated by the generating means corresponds to the value of the comparison current;
 means for storing the value of said reference current corresponding to said comparison current so that said reference current is used as a basis for subsequent comparison with said comparison current; and
 means for subsequently comparing said stored reference current or a current based thereon with said comparison current and for producing an output signal for controlling disconnection of the telephone set to the telephone line in response thereto.

Preferably, the generating means produces sequentially successively reduced values of reference currents.

Thus, the present invention relies upon the detection of line current in a telephone line. The problem which has existed in the past with the detection of line currents in a telephone line has been that the line current varies depending on the length of line between a central office and the particular telephone set. Thus, it is not possible to implement a detection circuit with a preset threshold value for detection which would be satisfactory in all of the telephone sets in a system. Because of this difficulty, prior parallel phone detection circuits have relied upon the detection of voltages.

However, an advantage of detecting the line current is that it is common between different countries, and is currently set at 140 mA. Thus, the present invention has the advantage that it can be utilised in telephone sets regardless of their intended country of use. It also has the advantage that it can be implemented as an integrated circuit within the existing speech circuit of a telephone set without consuming any extra components and integrated circuit pins. It nevertheless provides accurate and reliable detection even in noisy environments and for long distance telephone lines.

This arises as a result of first ascertaining by comparison the correct reference current for the particular telephone set and then utilising that reference current for subsequent comparison steps.

Preferably, once the reference current corresponding to the comparison current has been determined, it is reduced by a predetermined value, a so-called offset current, and this reduced value is then used for subsequent comparison. This ensures that the current which is used as the reference current for comparison purposes is always set lower than the value based on the originally detected line current so as to avoid small changes in the line current triggering the detection mechanism.

Preferably the circuit includes a duration counter connected to receive the output signal from the comparing means, the duration counter being operable to detect whether or not the output signal from the comparing means maintains the same state during a predetermined duration. This is to ensure that any changes in the output of the comparing means are maintained for a preset time and so checks whether or not they are valid changes or whether they have perhaps arisen from spikes or disturbances on the line.

The line detection circuit of the present invention is intended for use as a parallel phone detection circuit. That is, it is intended to be used when a call is to be transferred between a first telephone set and a second telephone set. With the call in progress on the first telephone set, a hold key on the first telephone set is depressed and then the handset of the first telephone set is replaced on-hook. On depression of the hold key, the line current detection circuit is activated to produced the stored reference current. At this point, the first telephone set is connected to the telephone line through a control signal which will maintain the first telephone set connected to the telephone line regardless of the off-hook or on-hook position of its handset. Thus, even when the handset of the first telephone set is taken off-hook, the first telephone set remains connected to the telephone line. In this state, the line current detection circuit then continues to compare the stored reference current with the comparison current derived from the line current and produces an output when there is a significant drop in the telephone line current as a result of connection of the second telephone set to the telephone line. On detection of this condition, the first telephone set is disconnected from the telephone line.

In a particularly preferred embodiment there is provided a maximum time counter which provides an output signal a predetermined time after the handset of the first telephone set has been placed on-hook. If within that predetermined time a second telephone set has not been taken off-hook the first telephone set is automatically disconnected in response to the output signal of the maximum time counter. This means that the line is not kept busy unnecessarily.

Thus, the present invention also provides a method of detecting a telephone line current comprising the steps of:
  deriving a comparison current from the line current of a telephone line;
  producing sequentially different values of reference current;
  determining when the value of a reference current generated by the generating means corresponds to the value of the comparison current;
  storing the value of said reference current corresponding to said comparison current so that said reference current is used as a basis for subsequent comparison with said comparison current; and
  comparing said stored reference current or a current based thereon with said comparison current and controlling disconnection of the telephone set to the telephone line in response thereto.

Preferably the step of producing sequentially different values of reference current comprises producing successively reduced values.

In the preferred embodiment, the determining means and the comparing means are implemented as a single comparator which firstly operates to determine the reference current and then operates to compare that reference current with the line current. This implementation minimizes the components required in the circuit and thus reduces its size and cost.

Preferably the generating means comprises a current source, a divider for producing respective reference currents derived from the current source and having respective different values, and switching means for selectively switching said reference currents so as to produce said sequentially successively reduced values.

For a better understanding of the present invention and to show how the same may be carried into effect reference will now be made by way of example to the accompanying drawings.

DESCRIPTION OF THE PREFERRED EMBODIMENT

Figure 1:
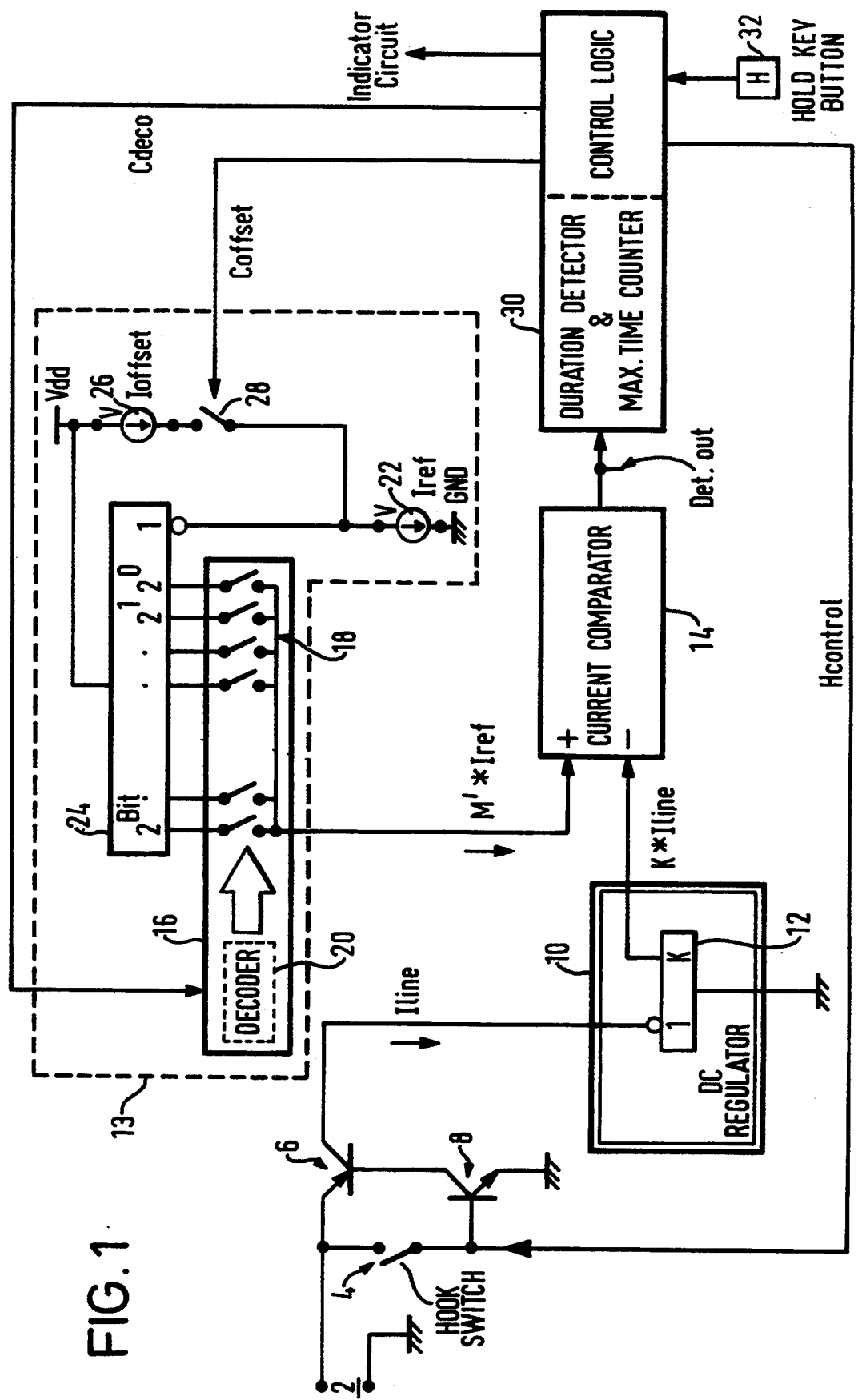
FIG. 1 is a block diagram of a line current detection circuit.

FIG. 1 illustrates a line current detection circuit in accordance with a preferred embodiment of the present invention.

Reference numeral 2 denotes a telephone line which for the purposes of the present invention is considered to have at least two telephone sets connected to it. Normally, several telephone sets will be provided in a system sharing the telephone line. The circuit shown in FIG. 1 is provided for each telephone set. For the purposes of easing the following description, the circuit is considered to belong to a first telephone set A, while a similar circuit would be provided in a second telephone set B.

In practice, the circuit illustrated in FIG. 1 (with the exception of the hook switch 4 and control transistors 6,8) is implemented as an integrated circuit within the speech circuit of the telephone handset of each of the telephones connected to the telephone line 2. Each telephone includes a hook switch 4 which determines whether or not the telephone set is connected to the telephone line. Thus, in normal operation when the handset is lifted up, the hook switch 4 is closed and the telephone set is connected to the telephone line 2. When the handset is replaced, the hook switch is opened and the telephone set is disconnected from the telephone line. The telephone also includes first and second control transistors 6,8 which control connection of the telephone set to the telephone line, regardless of the state of the hook switch 4.

When the telephone set is connected to the telephone line, a line current Iline flows from the telephone line into the speech circuit to operate the telephone. The speech circuit is indicated by reference numeral 10 in FIG. 1 and conventionally includes a DC regulator.

In the line current detection circuit of FIG. 1, the DC regulator includes a comparison current generating circuit 12. This circuit 12 receives the line current Iline and generates from that current a comparison current which is a fraction K of the line current Iline. The comparison current is thus denoted K*Iline where K is generally less than 1. The circuit 12 can be implemented by a simple current mirror or similar circuit.

The comparison current K*Iline is fed to a current comparator 14. The current comparator 14 also receives a reference current which is generated by a current generator, denoted by dotted line 13, as follows.

The current generator 13 includes a switching circuit 16 which includes a plurality of switches 18 under the control of a decoder 20. A current source 22 supplies a base current Iref between power supply rails Vdd and GND. Any suitable current generating circuit could be used to provide the current source 22. The base current is K*140 mA since that is the maximum line current in telephone systems worldwide. Of course, this value can be any suitable value to meet individual requirements. The switching circuit 16 is connected to the current source 22 through a divider 24 which is capable of dividing the current Iref from the current source 22 into a number of predetermined levels, each level having a particular bit value associated therewith. Each current level ($2^0, 2^1 \ldots 2^{Bit}$) is supplied to a respective one of the switches 18. Thus, the current delivered by the current generator 13 M'*Iref depends on the number of switches activated by the decoder 20.

$$M' = \left\{ \sum_{i=0}^{n} 2^i \right.$$

The current generator operates so as to sequentially provide successive values of reference current starting from a maximum value Mmax*Iref and reducing stepwise through subsequent values down to M1*Iref,M0*Iref. Preferably, Mmax=1 and M0=zero. The number of steps between the maximum value of reference current generated by the generator and zero will vary according to specific requirements and will thus be selected according to the particular implementation.

The current generator 13 also includes a second current source 26 connected between the power supply rails Vdd and GND and which provides an offset current Ioffset. The second current source 26 is associated with an offset control switch 28. When the control switch 28 is on, (closed in FIG. 1) the basic reference current available to the divider is reduced by a value Ioffset. In that case, the reference current supplied to the current comparator 14 will be M'*(Iref-Ioffset). In one embodiment, Ioffset=$^{Iref}/4$ but this relationship can be varied to suit particular requirements.

The current comparator 14 has an output indicated Det.Out in FIG. 1 which is supplied to a duration detector and maximum time counter accompanied by control logic. This is designated in FIG. 1 by reference numeral 30 and will be described in more detail with reference to FIG. 4. The control logic supplies an output Coffset for controlling the control switch 28, an output Cdeco for controlling the decoder 20, an output Hcontrol for controlling the hook switch 4 and an output to an indicator circuit provided on the telephone set. The control logic receives an input from a hold key button 32 also supplied on the telephone set.

Figure 4:
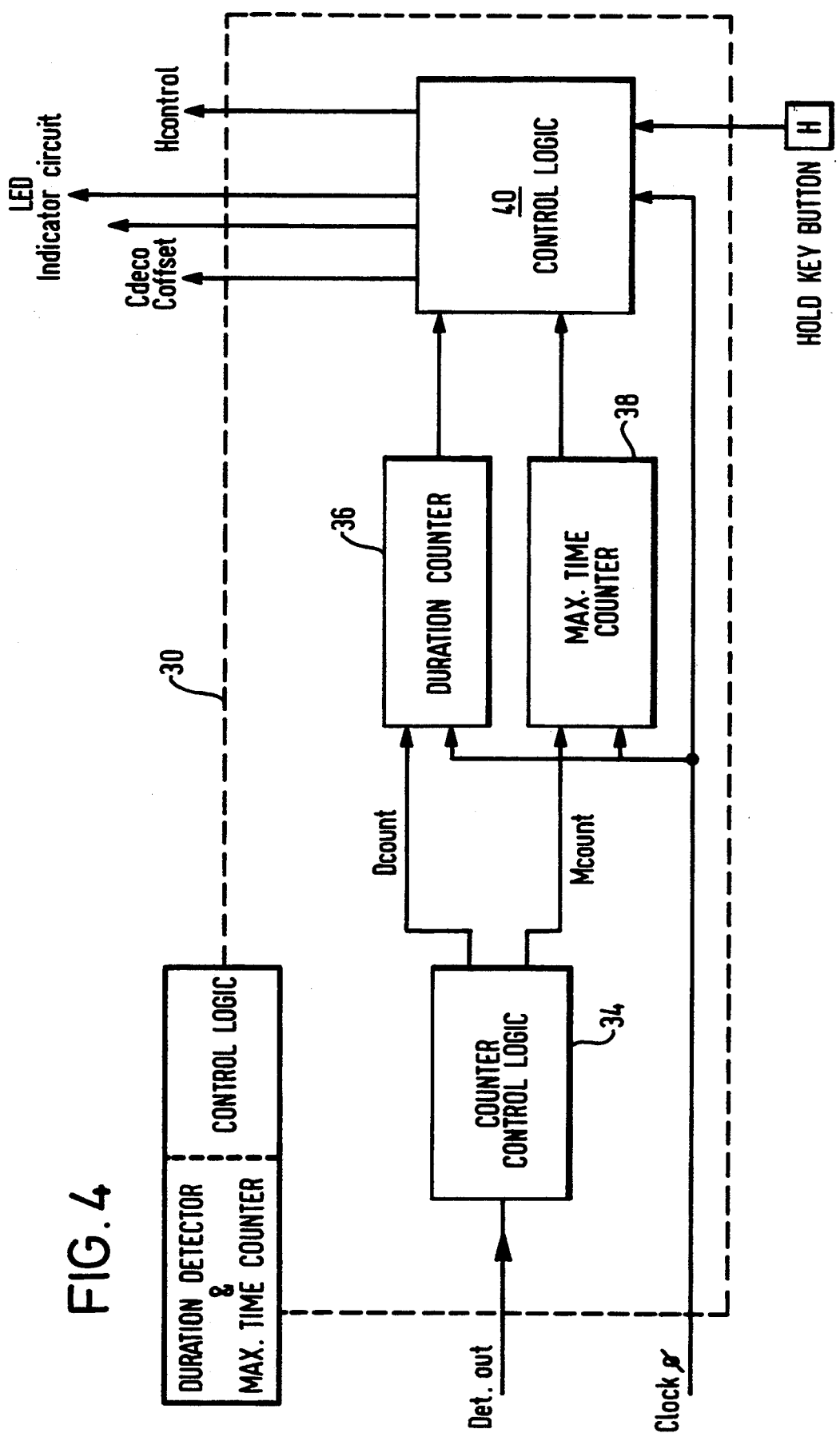
FIG. 4 is a block diagram showing an implementation of the duration detector and control logic in FIG. 1.

Reference will now be made to FIG. 4 to describe an implementation of the duration detector and maximum time counter with associated control logic 30. It comprises a counter control logic circuit 34 which receives the output Det.out from the comparator 14. The counter control logic circuit 34 supplies an output Dcount to a duration counter and an output Mcount to a maximum time counter. Both of these counters 36,38 are controlled by a clock signal $\phi$. The outputs of the duration counter and maximum time counter 38 are supplied to control logic circuitry 40. The control logic 40 supplies the control signals described above with reference to FIG. 1. Its operations are also controlled by the clock signal $\phi$.

Operation of the line detection circuit will now be described with reference to FIGS. 2 and 3.

At time $t_0$, the first telephone set, set A, has its handset removed and is so taken off-hook. This is illustrated in FIGS. 3a and 3b; where FIG. 3a denotes the state of the telephone handset (on or off hook) and FIG. 3b denotes whether or not the set is connected to the telephone line. When it is desired to transfer the call in progress to another telephone set (set B) the hold key button 32 on the telephone set A is depressed (at time $t_1$) and this sends a pulse to the control logic 40 as illustrated in FIG. 3d. At the trailing edge of the pulse (time $t_2$), the control logic 40 outputs the signal Cdeco which causes the decoder 20 to commence operation of the current generator. This is the start condition 42 of the flow chart in FIG. 2. All the switches 18 are closed so that the maximum current generated by the current source 22 through the divider 24 Mmax*Iref is supplied to the current comparator 14 which, as described above with reference to FIG. 1, receives at its other input a fraction of the line current Iline, K*Iline. The reference current Mmax*Iref and the comparison current K*Iline are compared as indicated in step 44 of the flow chart of FIG. 2. If the reference current is greater than the comparison current K*Iline the decoder 20 is instructed by the control signal Cdeco to reduce the reference current by opening the least significant one of the switches 18 (2°) to produce a reduced value of current (Mmax-1)*Iref for comparison with the comparison current K*Iline. This is illustrated by block 46 in FIG. 2. These steps of sequential comparison and reduction in reference current are repeated until the comparison current is determined by the comparator 14 to exceed the reference current. When this occurs, the signal Det.out changes state as illustrated in FIG. 3f at time $t_3$ and this causes the duration counter 36 to commence counting to define a duration time of, for example, 100 ms. If the result of the comparison is not the same at the end of the duration time it is assumed that result was an incorrect result as a result of a current spike or disturbance on the line and the process of comparison begins again as indicated by the arrow marked "not enough duration" in FIG. 2. If however the result of the comparison remains the same at the end of the duration time it is assumed that the reference current has reached a value corresponding to the comparison current K*Iline and the control logic is caused to produced the control signal Coffset (at time $t_4$) which connects the offset current Ioffset into the circuit. Thus, the value of the reference current now fed to the current comparator is M'*(Iref-Ioffset). In addition, the setting of the switches 18 is stored so that the reference current corresponding to the comparison current K*Iline is stored. This is illustrated by box 48 in FIG. 2.

The control logic also produces at the end of the predetermined duration the control signal Hcontrol (FIG. 3j) which controls the first and second transistors 6,8 to maintain the first telephone set connected to the telephone line regardless of the state of its hook control switch 4.

This procedure overcomes the difficulties which have formerly faced line current detection circuits. The line current in any telephone line varies along the line, being higher close to the central office and lower at a distance therefrom. The described circuit provides a way of detecting and storing for further comparison purposes the particular line current of the telephone set in question.

During this procedure, the user will have replaced the first telephone set A on-hook as denoted at time $t_5$ in FIG. 3a. The set A remains connected to the telephone line however under the influence of the Hcontrol signal.

Once the reference current has been set to M'*(Iref-Ioffset) the comparator 14 continues to compare this with the comparison current K*Iline. When the second telephone set, set B, is taken off-hook and connected to the telephone line as indicated in FIG. 3c at time $t_6$ the comparator output Det.out again changes state since the connection of set B to the telephone line will reduce the line current approximately by half (assuming that the impedances of the telephone sets A and B are matched). Thus, the comparison current K*Iline will fall below the reference value M'*(Iref-Ioffset) (block 50 in FIG. 2). The provision of an offset value ensures that the value used for reference purposes is certainly below the normal telephone line current so that minor changes in the telephone line current arising from spikes or disturbances will not trigger detection.

Figure 2:
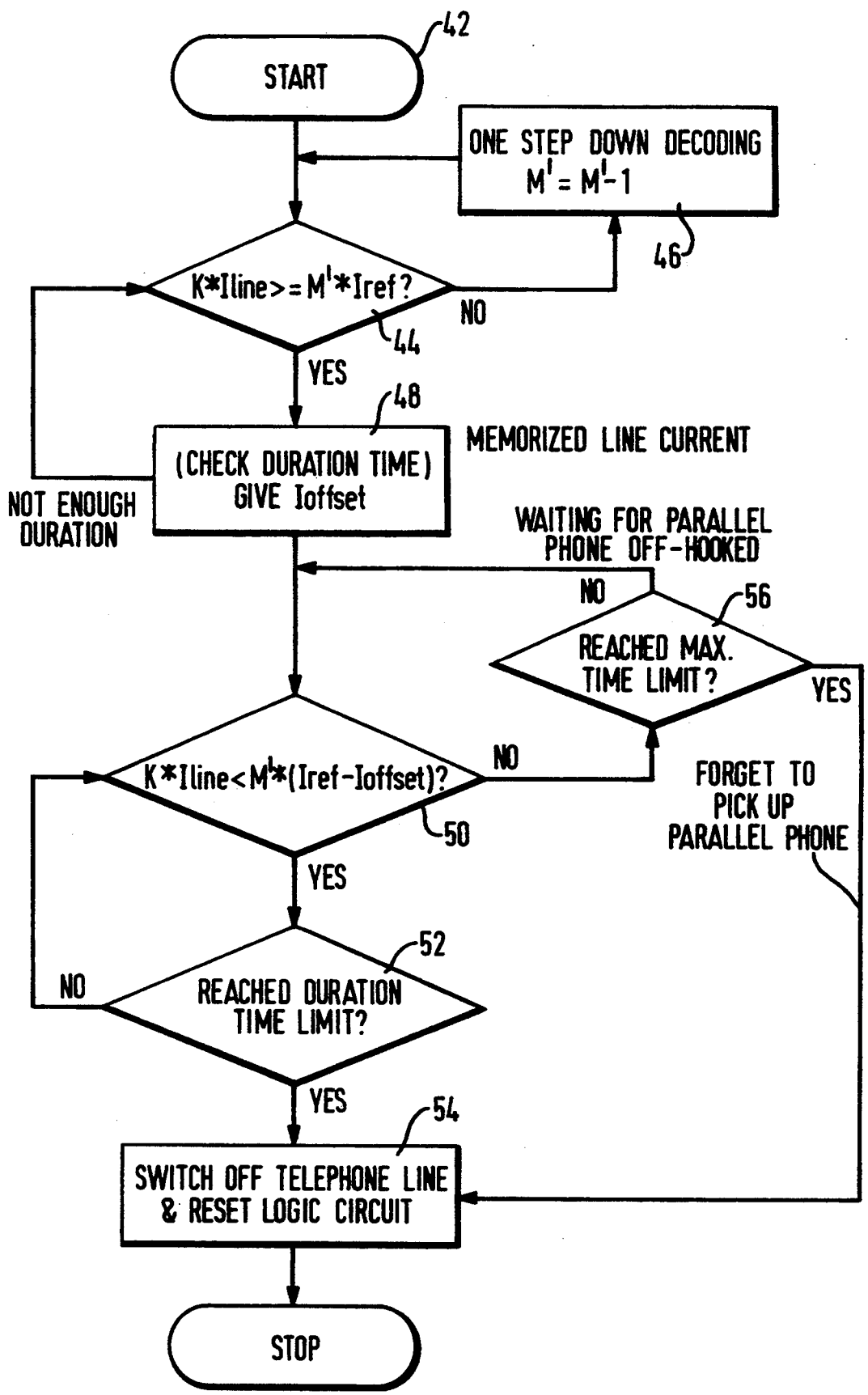
FIG. 2 is a flow chart showing the operation of the block diagram of FIG. 1.
Figure 3:
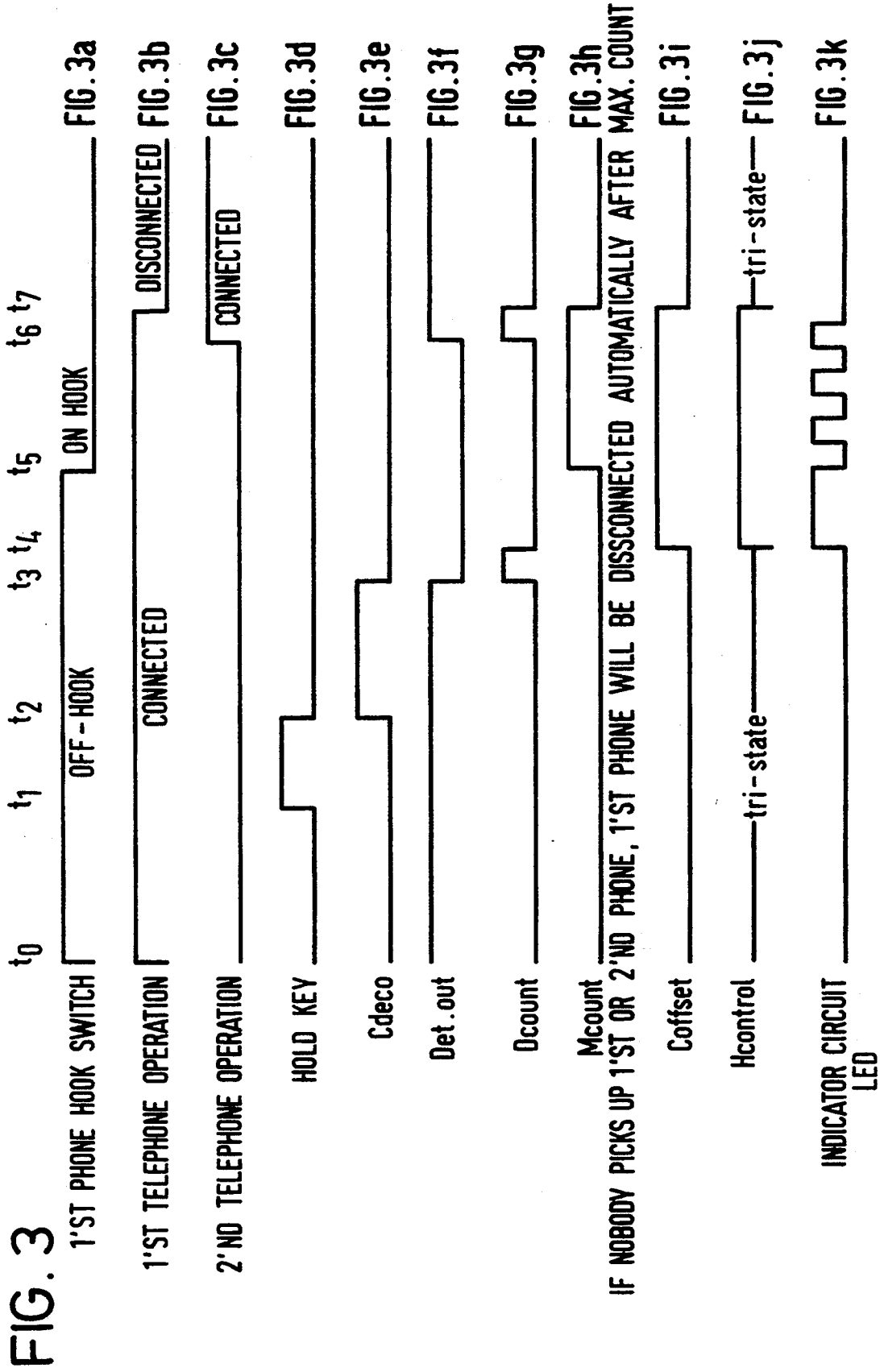
FIGS. 3a–3k illustrate various timing diagrams.

Once again, the signal Det.out causes the duration counter 36 to commence counting for a predetermined duration to ensure that the output of the comparator has not changed as a result of a spike or disturbance on the line (block 52 in FIG. 2). If the result of the comparison does not change within the preset duration, the second phone set is considered to be connected to the phone line and the first set is thus disconnected by deactivating the Hcontrol signal (FIGS. 3b and 3i at time $t_7$): block 54 in FIG. 2.

If within the predetermined time limit however there is a change in the comparator output, as indicated by the line NO from block 52 in FIG. 2, this is considered to be the result of a spike on the line. The spike is removed and the process of comparison is restarted at block 50.

The above procedure describes a situation where the user carries out the sequence of events in the correct manner. That is, the user has depressed the hold button on the telephone set A, replaced the receiver of telephone A and then lifted up the handset of telephone set B. The call will now be transferred to telephone set B.

If however the user depresses the hold button, replaces the handset of telephone set A and then forgets to pick up the handset of telephone set B, the line detection circuit described herein has a procedure for automatically disconnecting the first telephone from the telephone line after a predetermined time. This is accomplished by the signal Mcount in FIG. 3h. The signal Mcount is activated by replacement of the handset of telephone set A on-hook as indicated at time $t_5$ in FIG. 3a. This action provides a signal Mcount to the maximum time counter 38 (FIG. 4) which produces a signal to the control logic after a predetermined time. If during that predetermined time the comparator has not detected a change in the telephone line current, that is if the result of the comparison at block 50 in FIG. 2 remains NO, the trailing edge of the signal Mcount will cause the first telephone set to be disconnected from the telephone line by changing the state of the signal Hcontrol. This is denoted by block 56 in FIG. 2.

The described circuit thus provides a circuit in which a threshold current is generated which is related to the actual telephone line current and also implements a hook switch control sequence which reliably disconnects the first telephone set either when the second telephone set has been taken off-hook or after a predetermined time.

The indicator circuit control signal supplied by the control logic 40 is used to operate a light emitting diode which is turned on when the first telephone set is connected to the line by activation of the Hcontrol signal and which begins to flash during the Mcount period. This is denoted by FIG. 3k.

What is claimed is:

1. A line current detection circuit for use in a telephone set comprising:
    means for deriving a comparison current from the line current of a telephone line;
    generating means for producing sequentially different values of reference currents;
    means for determining when the value of a reference current generated by the generating means corresponds to the value of the comparison current;
    means for storing the value of said reference current corresponding to said comparison current so that said reference current is used as a basis for subsequent comparison with said comparison current; and
    means for subsequently comparing said stored reference current or a current based thereon with said comparison current and for producing an output signal for controlling disconnection of the telephone set to the telephone line in response thereto.

2. A circuit as claimed in claim 1 further comprising means for reducing said stored reference current by a predetermined offset value, said offset-reduced reference current being used as a basis for subsequent comparison with said comparison current.

3. A circuit as claimed in claim 1 or 2 which comprises a duration counter connected to receive the output signal from the comparing means, the duration counter being operable to detect whether or not the output signal from the comparing means maintains the same state during a predetermined duration.

4. A circuit as claimed in claim 1 or 2 comprising connection control means responsive to said output signal for maintaining the telephone set connected to the telephone line until the comparing means detects that a second telephone set has been connected to the telephone line, whereupon the first-mentioned telephone set is disconnected.

5. A circuit as claimed in claim 4, which comprises a maximum time counter operable to provide an output signal a predetermined time after the first-mentioned telephone set has been placed in an on-hook condition and to control said connection control means to disconnect said first-mentioned telephone set in the condition that a second telephone set has not been connected to the telephone line within said predetermined time.

6. A circuit as claimed in claim 1 or 2, which comprises:
    a duration counter connected to receive the output signal from the comparing means, the duration counter being operable to detect whether or not the output signal from the comparing means maintains the same state during a predetermined duration; and
    connection control means responsive to said output signal for maintaining the telephone set connected to the telephone line until the comparing means detects that a second telephone set has been connected to the telephone line, whereupon the first mentioned set is disconnected.

7. A circuit as claimed in claim 6, which comprises a maximum time counter operable to provide an output signal a predetermined time after the first-mentioned telephone set has been placed in an on-hook condition and to control said connection control means to disconnect said first-mentioned telephone set in the condition that a second telephone set has not been connected to the telephone line within said predetermined time.

8. A circuit as claimed in claim 1 or 2 wherein said determining means and said comparing means are provided by a comparator having a first input for receiving said comparison current and a second input for receiving said reference current.

9. A circuit as claimed in claim 1 or 2 wherein said generating means is operable to produce sequentially successively reduced values of current.

10. A circuit as claimed in claim 8 wherein said generating means is operable to produce sequentially successively reduced values of current.

11. A circuit as claimed in claim 9 wherein said generating means comprises a current source, a divider for producing from said current source a plurality of reference currents of different values and switching circuitry for connecting or disconnecting said reference currents of different values thereby to produce said sequentially successively reduced values of reference currents.

12. A circuit as claimed in claim 10 wherein said generating means comprises a current source, a divider for producing from said current source a plurality of reference currents of different values and switching circuitry for connecting or disconnecting said reference currents of different values thereby to produce said sequentially successively reduced values of reference currents.

13. A method of detecting a telephone line current comprising the steps of:
   deriving a comparison current from the line current of the telephone line;
   producing sequentially different values of reference current;
   determining when the value of a reference current corresponds to the value of the comparison current;
   storing the value of said reference current corresponding to said comparison current so that said reference current is used as a basis for subsequent comparison with said comparison current; and
   comparing said stored reference current or a current based thereon with said comparison current and controlling disconnection of a telephone set to a telephone line in response thereto.

14. A method as claimed in claim 13 further comprising the step of detecting whether or not the output from the comparing means maintains the same state during a predetermined duration.

15. A method as claimed in claim 13 or 14 further comprising the step of determining whether a second telephone set has been taken off-hook within a predetermined time of a first telephone set being placed in an on-hook condition, and for disconnecting the first telephone set after said predetermined time if such on-hook condition is detected.

16. A method as claimed in claim 13 or 14 wherein said different values of reference current are produced sequentially as successively reduced values of current.

17. A method as claimed in claim 15 wherein said different values of reference current are produced sequentially as successively reduced values of current.

* * * * *